W. VAN ANDEN.
Nuts.

No. 137,395.  Patented April 1, 1873.

grain of metal

Witnesses:  Inventor:
A. Bennerkendorf.  W. Van Anden
Sedgwick
 PER
 Attorneys.

UNITED STATES PATENT OFFICE.

WILLIAM VAN ANDEN, OF POUGHKEEPSIE, NEW YORK.

IMPROVEMENT IN NUTS.

Specification forming part of Letters Patent No. 137,395, dated April 1, 1873; application filed February 21, 1873.

*To all whom it may concern:*

Be it known that I, WILLIAM VAN ANDEN, of Poughkeepsie, in the county of Dutchess and State of New York, have invented a new and useful Improvement in Nuts, of which the following is a specification:

Nuts for screw-bolts that are made by punching or cutting them from bars of rolled metal have the fiber or grain of the iron disposed diametrically to them in some parts, so that a splitting or bursting strain on the nut acts on the metal in the direction of the least adhesion—that is, transversely to the grain—so that they split open easily. Nuts which are formed of short sections of tubes or rods are in all parts exposed to the action of bursting strain in the direction in which the metal has least adhesion. I propose to so dispose the grain of the metal that it will cross the lines in which the metal is liable to separate or split by the bursting strains, and thus oppose said strains by its greatest power of adhesion; and to this end I twist the rods or tubes of which I make the nuts, so as to give a spiral direction to the fiber or grain of more or less pitch, as may be required, and thus have the longitudinal tension of it to oppose the bursting or splitting action, which will increase the strength to a very great extent, for it makes the difference between pulling the fiber apart endwise or splitting the parallel fiber. In practice, I will twist the rod, say, so as to have about half a turn in the length of the nut; then cut off the section a little longer than the actual length of the nut I want, and "upset" it to the length required, and then finish it up in any approved nut-making machine.

Figure 1:
Figure 2:
Figure 3:
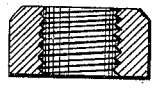

Figure 1 is a section of a twisted rod such as I propose to use for making nuts. Fig. 2 is a side elevation of a blank after being cut off and upset, and Fig. 3 is a sectional elevation of a nut made according to my improvement.

Similar letters of reference indicate corresponding parts.

Before cutting up the rods into the short pieces required for the nuts I twist said rods, as indicated in Fig. 1, to dispose the metal as above stated, and thus cause the grain to extend in its lengthwise direction from a half to two-thirds of a coil around the nut, so as to cross the lines of the bursting strains, or the directions in which these strains act, and thus oppose them in the direction in which the adhesion of the metal is most powerful; for by so twisting the rods they will be heated, of course, and then twisted in any approved way. They may, if preferred, be run through rolls after being twisted to condense the metal again, or they may be twisted while being rolled.

Having thus described my invention, I claim as new and desire to secure by Letters Patent—

Nuts in which the fiber of the iron is coiled spirally to the axis of the hole, substantially as specified.

WILLIAM VAN ANDEN.

Witnesses:
 ROBT. N. PALMER,
 EGBERT Q. ELDRIDGE.